US007989083B2

(12) United States Patent
Morikawa et al.

(10) Patent No.: US 7,989,083 B2
(45) Date of Patent: Aug. 2, 2011

(54) ACID-MODIFIED POLYPROPYLENE RESIN, METHOD FOR PRODUCING SAME, AND RESIN COMPOSITION USING SAME

(75) Inventors: Kenichi Morikawa, Yokkaichi (JP); Katsutoshi Ohno, Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 379 days.

(21) Appl. No.: 11/913,003

(22) PCT Filed: Apr. 28, 2006

(86) PCT No.: PCT/JP2006/309035
§ 371 (c)(1),
(2), (4) Date: Oct. 29, 2007

(87) PCT Pub. No.: WO2006/118272
PCT Pub. Date: Nov. 9, 2006

(65) Prior Publication Data
US 2009/0068483 A1  Mar. 12, 2009

(30) Foreign Application Priority Data

Apr. 28, 2005  (JP) ................................. 2005-133344

(51) Int. Cl.
*C08F 8/18* (2006.01)
(52) U.S. Cl. ............... 428/522; 525/69; 525/71; 525/74; 525/78; 525/80; 525/191; 525/222; 525/240; 525/285; 525/322
(58) Field of Classification Search ................. 428/522; 525/69, 71, 74, 78, 80, 191, 222, 240, 285, 525/322
See application file for complete search history.

(56) References Cited

U.S. PATENT DOCUMENTS

| 4,654,255 | A | * | 3/1987 | Kojima et al. | ................. 442/149 |
| 4,737,548 | A | * | 4/1988 | Kojima et al. | ................. 525/193 |
| 5,539,057 | A | * | 7/1996 | Giroux | ......................... 525/309 |
| 7,235,610 | B2 | * | 6/2007 | Fujino et al. | ................ 525/334.1 |
| 7,304,111 | B2 | * | 12/2007 | Onoe et al. | ..................... 525/323 |
| 2004/0202806 | A1 | | 10/2004 | Pradel | |
| 2005/0171271 | A1 | | 8/2005 | Fujino et al. | |

FOREIGN PATENT DOCUMENTS

| EP | 0 636 653 A1 | 2/1995 |
| EP | 0636653 | * 2/1995 |
| EP | 1 541 602 A1 | 6/2005 |
| EP | 1 602 672 A1 | 12/2005 |
| EP | 1602672 | * 12/2005 |
| EP | 1541602 | * 6/2009 |
| JP | 61 26609 | 2/1986 |
| JP | 63 258914 | 10/1988 |
| JP | 4-505339 | 9/1992 |
| JP | 5 279431 | 10/1993 |
| JP | 7 224123 | 8/1995 |
| JP | 8 217835 | 8/1996 |
| JP | 9-111069 | 4/1997 |
| JP | 2002 20436 | 1/2002 |
| JP | 2003 183336 | 7/2003 |
| JP | 2003 201322 | 7/2003 |
| JP | 2003 221469 | 8/2003 |
| JP | 2003-327761 | 11/2003 |
| JP | 2004-507593 | 3/2004 |
| JP | 2004 269866 | 9/2004 |
| JP | 2004 269872 | 9/2004 |
| JP | 2004 300192 | 10/2004 |

OTHER PUBLICATIONS

Comments submitted by a third party on Apr. 8, 2011 in JP2006-125266 (with English translation).

* cited by examiner

*Primary Examiner* — Leszek Kiliman
(74) *Attorney, Agent, or Firm* — Oblon, Spivak, McClelland, Maier & Neustadt, L.L.P.

(57) ABSTRACT

To provide an acid-modified polypropylene resin which can be used for an adhesive capable of bonding a polyolefin type resin and a polar resin with sufficient force, its production process and a resin composition using it.

An acid-modified polypropylene resin, which is obtained by grafting an organic acid component to a polypropylene resin, wherein the polypropylene resin is an isotactic polypropylene resin, the grafted amount X (wt %) of the organic acid component in the acid-modified polypropylene resin is within a range of from 1.0 wt % to 20.0 wt %, and the melt flow rate Y (g/10 min) of the acid-modified polypropylene resin satisfies the expression: $Y \leq 18.5 \exp(0.82X)$, a process for producing such an acid-modified polypropylene resin, a resin composition using it and a laminate.

20 Claims, 1 Drawing Sheet

ACID-MODIFIED POLYPROPYLENE RESIN, METHOD FOR PRODUCING SAME, AND RESIN COMPOSITION USING SAME

TECHNICAL FIELD

The present invention relates to an acid-modified polypropylene resin having an organic acid component grafted to a polypropylene main chain, its production process, and a resin composition using it.

BACKGROUND ART

A polypropylene which is a general purpose resin and a copolymer of propylene with another copolymerizable monomer (hereinafter they will collectively be referred to as a "polypropylene resin") are available relatively at a low cost and have favorable properties such as moldability, heat resistance, solvent resistance, mechanical properties and appearance and are thereby processed into various molded products and used in various fields. However, a polypropylene resin is basically composed of a saturated hydrocarbon and is thereby poor in chemical reactivity and has low polarity, and accordingly improvement in adhesive properties, coating properties and printing properties has been desired.

As a method for improving them, a method of grafting, to a polypropylene resin, an unsaturated carboxylic acid or its anhydride, represented by e.g. maleic anhydride, to modify the polypropylene resin, has been known. Such an acid-modified polypropylene resin is produced by graft reaction of an organic acid component, using, as an initiator, radicals generated by an organic peroxide, heat decomposition or the like.

However, it has been known that the graft reaction is a competitive reaction between the graft reaction of an acid component and β-cleavage reaction of the polypropylene molecular chain, and since the β-cleavage reaction rate is generally higher than the graft reaction rate, improvement in the grafted amount involves a decrease in the molecular weight resultingly. Such a polypropylene resin having its molecular weight decreased during the graft reaction has impaired physical properties such as adhesive strength and impact resistance, and accordingly from the viewpoint of improvement in physical properties, development of an acid-modified polypropylene resin having improved balance between the grafted amount and the molecular weight has been desired, and various proposals have been made (Patent Documents 1 and 2).

In recent years, as requirements for resin materials in various applications are increasingly high, development of a composite material having a plurality of properties by bonding such different materials differing in characteristics is in progress. To develop such a composite material, a high quality adhesive to bond different materials is required, but usually a polyolefin type resin such as a polypropylene has low polarity and thereby has very poor adhesive properties with a polar resin, and thus development of an adhesive capable of bonding a polyolefin type resin and a polar resin with sufficient adhesive force has been desired.

Patent Document 1: JP-A-2002-020436
Patent Document 2: JP-A-2003-183336

DISCLOSURE OF THE INVENTION

Object to be Accomplished by the Invention

Under these circumstances, it is an object of the present invention to provide an acid-modified polypropylene resin which can be used as an adhesive capable of bonding a polyolefin type resin and a polar resin with sufficient force, its production process, and a resin composition using it.

Means to Accomplish the Object

The present inventors have conducted extensive studies to achieve the above object and as a result, found that the above object can be achieved by an acid-modified polypropylene resin such that the melt flow rate (MFR) of the acid-modified polypropylene resin and the grafted amount of an organic acid component satisfy specific relation, and accomplished the present invention.

Namely, the present invention resides in an acid-modified polypropylene resin, which is obtained by grafting an organic acid component to a polypropylene resin, wherein the polypropylene resin is an isotactic polypropylene resin, the grafted amount X (wt %) of the organic acid component in the acid-modified polypropylene resin is within a range of from 1.0 to 20.0 (wt %), and the melt flow rate Y (g/10 min) of the acid-modified polypropylene resin satisfies the expression:

$$Y \leq 18.5 \exp(0.82X) \qquad (1)$$

Preferably, Y is at least 10 g/10 min. Further, X is preferably at least 1.5 wt %, more preferably at least 2.0 wt % and is preferably at most 15.0 wt %, more preferably at most 10.0 wt %.

In the present invention, the melt flow rate Y (g/10 min) of the acid-modified polypropylene resin is a value measured in accordance with JIS K7210 at a temperature of 180° C. under a load of 21.18 N. However, MFR of a polypropylene homopolymer is usually measured at 230° C. under 21.18 N.

Further, the grafted amount X is determined as follows. An acid-modified polypropylene resin is heat pressed to prepare a film with a thickness of about 100 μm, its infrared absorption spectrum is measured to calculate the content of an organic acid component in the acid-modified polypropylene resin from the area of an absorption peak (a peak in the vicinity of 1,780 $cm^{-1}$) of a carbonyl group, and the organic acid component content is regarded as the grafted amount X (wt %) (X=(amount of grafted organic acid component)/(total amount of acid-modified polypropylene resin)×100).

Usually, the organic acid component content is calculated from an analytical curve of the intensity of the absorption peak (a peak in the vicinity of 1,780 $cm^{-1}$) of a carbonyl group and the organic acid component content, preliminarily prepared from a standard sample.

In the present invention, "wt %" means "mass %".

Further, the present invention resides in a process for producing the above acid-modified polypropylene resin, which comprises mixing a polypropylene resin, an organic acid component and an organic peroxide represented by the formula (2) with heating to obtain the acid-modified polypropylene resin:

$$R_1\text{-}A\text{-}R_2 \qquad (2)$$

wherein A is a bivalent connecting group containing at least one structure represented by —O—CO—O—O—, and each of $R_1$ and $R_2$ which are independent of each other, is a $C_{1-9}$ saturated or unsaturated hydrocarbon group.

Preferably, the above mixing with heating is carried out in an organic solvent.

The present invention further resides in a polypropylene type resin composition, comprising 100 parts by weight of a polypropylene type resin, and from 0.1 to 30 parts by weight of the above acid-modified polypropylene resin. The present invention further resides in an adhesive resin composition comprising the above polypropylene type resin composition.

The present invention still further resides in a laminate comprising a substrate, and at least an adhesive layer comprising the above adhesive resin composition and a layer made of an ethylene/vinyl alcohol copolymer or a polyamide formed on the substrate. Preferably, the substrate is a polyolefin type resin substrate.

EFFECTS OF THE INVENTION

The acid-modified polypropylene resin of the present invention (hereinafter sometimes referred to as a resin of the present invention) has a high grafted amount and has a high molecular weight, and accordingly the resin of the present invention and a polypropylene type resin composition containing the resin of the present invention (hereinafter sometimes referred to as a resin composition of the present invention) have such advantages as very high adhesive properties and compatibility with both polar resin and polyolefin type resin. Accordingly, they are excellent in balance among adhesive properties, compatibility, printability, insulating properties/electrical conductivity, affinity with a filler, etc., and can be used for various applications.

Particularly, they can be used as an adhesive capable of bonding a polyolefin type resin and a polar resin with sufficient force, and accordingly a laminate as a composite material made of different materials, such as a laminated film or a laminated sheet, can be provided.

Further, the resin of the present invention is isotactic and thereby has high heat resistance and can undergo heat sterilization, and it is unlikely to be eluted in an oily substance or the like, and accordingly it is applicable to food and medical use.

Further, the resin of the present invention is excellent also in transparency and accordingly it can be used for coating without impairing the color tone and the like of an object to be coated. Further, it is excellent also in affinity with an inorganic filler, a pigment or the like, and accordingly it is preferably used as a resin composition for coating for various articles, such as automobile components.

According to the process for producing an acid-modified polypropylene resin of the present invention, the molecular weight of a polypropylene resin will not be decreased during graft reaction, and accordingly toughness of the resin of the present invention will not be impaired, and an extremely high grafted amount of an organic acid component in the present resin can be achieved.

The resin composition of the present invention is excellent also in compatibility with both polyolefin type resin and polar resin such as an ethylene/vinyl alcohol copolymer or a polyamide. Accordingly, by using an adhesive layer made of the resin composition of the present invention to laminate such resins, a laminate excellent in adhesive properties will be obtained. The obtained laminate can be applied, for example as a gas barrier sheet, to bottles, cups, tubes, etc. for food and medical use.

Further, the resin of the present invention has a high grafted amount and a high molecular weight and is excellent in compatibility with both polar resin and polyolefin, and accordingly when it is formed into a laminate, the laminate is excellent in regrind properties (characteristics when formed into a recycled material).

In the present invention, all the above effects are not necessarily essential, and one or more among the above effects should be achieved.

BEST MODE FOR CARRYING OUT THE INVENTION

Figure 1:
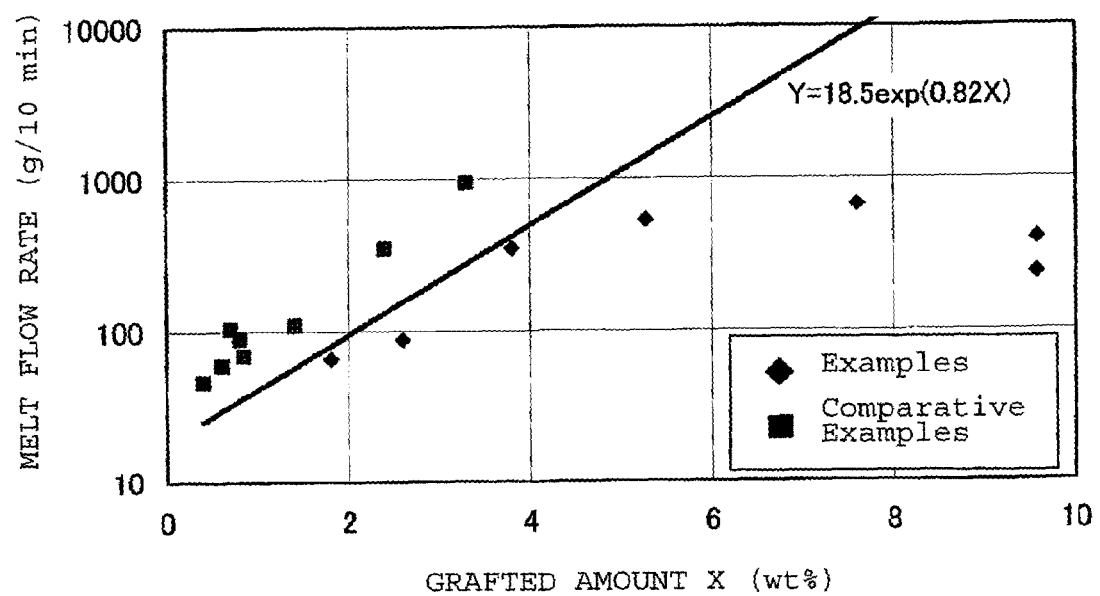
FIG. 1 is a logarithmic graph illustrating the relation between the grafted amount X and the melt flow rate Y in Examples and Comparative Examples.

The acid-modified polypropylene resin of the present invention is obtained by grafting an organic acid component to an isotactic polypropylene resin, the grafted amount X (wt %) of the organic acid component in the acid-modified polypropylene resin is within a range of from 1.0 wt % to 20.0 wt %, and the melt flow rate Y (g/10 min) of the acid-modified polypropylene resin satisfies the expression:

$$Y \leq 18.5 exp(0.82X) \quad (1)$$

Heretofore, the grafted amount X of an organic acid component is at a level of from 0.5 to 0.6 wt % at the highest (e.g. Patent Document 2), but by increasing the grafted amount to at least 1.0 wt %, a polar group such as a carboxylic acid group contained in the organic acid component can be introduced to the resin in a large amount, thereby to increase the adhesive properties with a polar resin and to increase affinity with an inorganic substance. X is preferably at least 1.5 wt %, more preferably at least 2.0 wt %.

Further, the grafted amount X is at most 20.0 wt %. If the organic acid component is introduced in an amount exceeding it, the increase in the melt flow rate Y i.e. the decrease in the molecular weight is inevitable, and physical properties such as adhesive strength and impact resistance of the resin will rather be impaired. Accordingly, introduction of the organic acid component in an amount more than the above is usually unfavorable. When emphasis is put on physical properties such as adhesive strength and impact resistance, X is preferably at most 15.0 wt %, more preferably at most 10.0 wt %.

The melt flow rate Y (g/10 min) of the resin of the present invention is set to satisfy the relational expression (1) with the grafted amount X. The melt flow rate Y correlates with the molecular weight of the resin, and generally the higher Y is, the lower the molecular weight. The expression (1) means that the molecular weight is not too low even when the grafted amount X is increased, and is necessary to obtain a resin having well balanced properties. When the melt flow rate Y satisfies the expression (1), physical properties such as adhesive strength and impact resistance can be secured, and the adhesive properties and the surface protective properties can be increased. More preferably, the expression (3) is satisfied:

$$Y \leq 18.5 exp(0.80X) \quad (3)$$

Further preferably, the expression (4) is satisfied:

$$Y \leq 18.5 exp(0.78X) \quad (4)$$

The melt flow rate Y is usually at most 100,000 g/10 min, preferably at most 10,000 g/10 min, more preferably at most 5,000 g/10 min.

In order to obtain sufficient dispersibility in a composition and flowability of the resin, the melt flow rate Y is preferably at least 1 g/10 min, more preferably at least 10 g/10 min, furthermore preferably at least 20 g/10 min.

The acid-modified polypropylene resin of the present invention which has the above properties exhibits strong adhesive force to both polyolefin type resin and polar resin, and accordingly the resin composition of the present invention containing it has such advantages that both the resins which are usually hardly bonded to each other can be well bonded, and various useful laminates can be obtained.

Further, the acid-modified polypropylene resin of the present invention has such advantages that decrease in the adhesive properties and strength (rigidity) can be suppressed even at high temperature. High temperature molding is preferably carried out to increase productivity of laminates, but heretofore, if high temperature molding is carried out, adhesive properties and strength are likely to decrease due to the decrease in the molecular weight of the resin by heating in the molding process. However, the resin of the present invention has a high molecular weight and accordingly a relatively high molecular weight can be kept even after high temperature molding is carried out, whereby excellent adhesive properties and strength can be maintained, and high productivity can be obtained.

Further, when the resin of the present invention is used as an adhesive resin composition, it can bond a polyolefin type resin such as a polypropylene to a polar resin such as an ethylene/vinyl alcohol copolymer (EVOH) or a polyamide, and it is thereby suitably applicable to e.g. production of a composite material made of different materials such as a laminated film or a laminated sheet. In addition, since strong adhesive force will be obtained with an amount of use smaller than conventional one, the amount of use can be reduced, thus leading to reduction in cost.

Further, the acid-modified polypropylene resin of the present invention has a high grafted amount and a high molecular weight and is excellent in compatibility with both polar resin and polyolefin, and accordingly when it is formed into a laminate, the laminate is excellent in regrind properties.

In general, in production of a laminate such as a gas barrier sheet, the remainder of the laminate after molding (e.g. a sheet remaining after a cup or the like is punched out from the laminated sheet) is heat melted and recycled to reuse it as an adhesive resin as a regrind material (recycled material). For example, a regrind material layer (recycled layer) is sandwiched between a polyolefin layer and an adhesive layer in many cases, e.g. in the structure of polypropylene/regrind material layer/adhesive layer/EVOH layer/adhesive layer/polypropylene.

Heretofore, a regrind material has had such a problem that the resin is cut by heating during recycle, thus lowering the molecular weight, whereby the adhesive properties and strength tend to decrease. Further, in the regrind material, a polar resin such as EVOH and a polypropylene coexist, and they are incompatible with each other, thus leading to problems such as poor appearance such as gelation or surface roughening, and the decrease in strength.

However, the acid-modified polypropylene resin of the present invention has a high molecular weight, and accordingly a relatively high molecular weight can be kept even after recycle, and high compatibility and high adhesive properties with a polyolefin, high strength and high toughness can be maintained. Further, since it has a high grafted amount, dispersibility of a polar resin such as EVOH or a polyamide is good, the regrind material is homogeneous, is unlikely to undergo gelation and is excellent in transparency, and accordingly the resulting laminate has favorable appearance. As mentioned above, the acid-modified polypropylene resin is easily recycled, environmentally friendly and is advantageous in cost.

Now, the process for producing the acid-modified polypropylene resin of the present invention (hereinafter sometimes referred to as "the production process of the present invention") which is another embodiment of the present invention will be described below.

The production process of the present invention is characterized by mixing a polypropylene resin, an organic acid component and an organic peroxide represented by the formula (2) with heating to obtain the acid-modified polypropylene resin of the present invention:

$$R_1\text{-}A\text{-}R_2 \quad (2)$$

wherein A is a bivalent connecting group containing at least one structure represented by —O—CO—O—O—, and each of $R_1$ and $R_2$ which are independent of each other, is a $C_{1-9}$ saturated or unsaturated hydrocarbon group.

According to studies by the present inventors, it was found that an acid-modified polypropylene resin having excellent properties can be obtained by using, when a polypropylene resin is subjected to graft reaction, an organic peroxide having a specific structure represented by the formula (2).

The reason is not necessarily clear, but according to studies by the present inventors, it is estimated that the graft reaction rate is high as compared with the β-cleavage reaction rate since the organic peroxide represented by the formula (2) provides high stability of radicals in the reaction site as compared with a conventional organic peroxide such as dicumyl peroxide, m-toluoyl and beonzoyl peroxide or bis(4-t-butyl-cyclohexyl) peroxydicarbonate. Thus, it is considered that the decrease in the molecular weight by the graft reaction is suppressed.

The organic peroxide represented by the formula (2) will be described. "A" is a bivalent connecting group containing at least one structure represented by —O—CO—O—O—. The —O—CO—O—O— structure is generally called a percarbonate ester, but the connecting group is not particularly limited so long as it has a structure containing the above structure and may have a structure of —O—CO—O—O—CO—O—. The number of the above structure is not particularly limited so long as at least one structure is contained, but the number is usually at most 5, preferably at most 3, more preferably at most 2. For example, the connecting group may have a structure containing a plurality of —O—CO—O—O— having a hydrocarbon group having from about 1 to about 10 carbon atoms sandwiched between the above structures. However, most preferably the connecting group has only one structure represented by —O—CO—O—O—. Further, "A" usually has a molecular weight of from about 76 to about 1,000, preferably from about 76 to about 500, although it is not particularly limited.

Each of $R_1$ and $R_2$ which are independent of each other is a $C_{1-9}$ saturated or unsaturated hydrocarbon group. The $C_{1-9}$ hydrocarbon group is not particularly limited so long as it is a linear or branched aliphatic, alicyclic or aromatic hydrocarbon group, and the aliphatic or alicyclic hydrocarbon group may be saturated or unsaturated. It may, for example, be a methyl group, an ethyl group, a propyl group, an isopropyl group, a butyl group, an isobutyl group, a s-butyl group, a t-butyl group, a pentyl group, an isopentyl group, a neopentyl group, a n-hexyl group, an isohexyl group, a t-hexyl group, a cyclohexyl group, a 2-ethylhexyl group, a vinyl group, an allyl group, a 1-propenyl group, a phenyl group, a tolyl group or a xylyl group.

Preferably, at least one of $R_1$ and $R_2$ is a linear or branched aliphatic or aromatic hydrocarbon group, more preferably a linear or branched aliphatic group, furthermore preferably a linear alkyl group or a branched chain alkyl group, particularly preferably a branched chain alkyl group. Further, they preferably have from 1 to 8 carbon atoms. Particularly preferred is an isopropyl group or a t-butyl group. More preferably both $R_1$ and $R_2$ are the above groups. Further, the organic peroxide usually has a molecular weight of from about 100 to about 1,500, preferably from about 100 to about 1,000 although it is not particularly limited.

Specifically, the organic peroxide represented by the formula (2) may, for example, be t-butyl peroxy isopropyl monocarbonate, t-hexyl peroxy isopropyl monocarbonate, t-butyl peroxy(2-ethylhexyl) monocarbonate, t-butyl peroxy allyl monocarbonate, diisopropyl peroxycarbonate, di-n-propyl peroxycarbonate, di-s-butyl peroxycarbonate, di-2-ethylhexyl peroxycarbonate or 1,6-bis(t-butylperoxycarbonyloxy) hexane. In terms of tradenames, PERBUTYL I (NOF CORPORATION), PERHEXYL I (NOF CORPORATION), PERBUTYL E (NOF CORPORATION), PEROMER AC (NOF CORPORATION) or PEROYL SBP (NOF CORPORATION) may, for example, be mentioned. Preferred is t-butyl peroxy isopropyl monocarbonate or t-hexyl peroxy isopropyl monocarbonate, and the most preferred is t-butyl peroxy isopropyl monocarbonate. The organic peroxides may be used alone or two or more of them may be used in combination.

In the production process of the present invention, the blend ratio of the respective materials is not particularly limited, but in order that the reaction proceeds sufficiently, the amount of the organic peroxide is preferably at least 0.01 part by weight per 100 parts by weight of the polypropylene resin. It is more preferably at least 0.05 part by weight, furthermore preferably at least 0.1 part by weight. However, when emphasis is put on suppression of the decrease in molecular weight of the polypropylene main chain, the amount of the organic peroxide is preferably at most 20 parts by weight per 100 parts by weight of the polypropylene resin. It is more preferably at most 15 parts by weight, more preferably at most 10 parts by weight. Further, in order that the reaction proceeds sufficiently, the amount of the organic acid component is at least 1 part by weight per 100 parts by weight of the polypropylene resin. It is more preferably at least 3 parts by weight, furthermore preferably at least 5 parts by weight. However, excessive blending not only increases the cost but tends to impair the hue of the resin if there is a large amount of an unreacted product, and when emphasis is put on suppression of such impairment, the amount of the organic acid component is preferably at most 100 parts by weight per 100 parts by weight of the polypropylene resin. It is more preferably at most 85 parts by weight, further more preferably at most 70 parts by weight.

The polypropylene resin used in the process for producing an acid-modified polypropylene resin of the present invention is an isotactic polypropylene resin. An isotactic polypropylene resin has high crystallinity and is excellent in rigidity, heat resistance and oil resistance as compared with another stereoregular polypropylene resin such as an atactic or syndiotactic polypropylene resin. Since it is excellent in rigidity, even a relatively thin laminate made of such a resin can maintain strength, and accordingly such a laminate can be preferably used as a container to be molded from e.g. a laminated sheet. Further, it is excellent in heat resistance and is thereby capable of undergo high temperature molding, and when used for food and medical use, it can undergo heat sterilization, such being favorable from hygienic viewpoint. Higher heat resistance is required when it is used for retort packaging.

Further, an isotactic polypropylene resin is a general purpose product and is thereby available at a low cost and capable of supplying inexpensive products.

In the present invention, the polypropylene resin may be a known polypropylene type polymer and is not particularly limited, and it may, for example, be a propylene homopolymer, a copolymer of ethylene and propylene, a copolymer of propylene with another comonomer, i.e. an $\alpha$-olefin comonomer having at least 2 carbon atoms such as butene-1, pentene-1, hexene-1, heptene-1, octene-1, cyclopentene, cyclohexene or norbornene, or a copolymer of two or more of such comonomers. The $\alpha$-olefin comonomer is preferably a $C_{2-6}$ $\alpha$-olefin comonomer. The polymer may be a random copolymer or a block copolymer. Further, the polypropylene resin may be a mixture thereof.

In a case where the polypropylene resin is a copolymer or a mixture, it contains a polypropylene resin component in an amount of preferably at least 30 wt %, more preferably at least 50 wt %, furthermore preferably at least 70 wt %.

However, most preferred is a propylene homopolymer. The higher the content of propylene, the higher the heat resistance and the more the adhesive properties to a polypropylene tend to increase. Further, gelation hardly occurs, and defects such as so-called fish eyes can be suppressed.

Preferably, the melting point of the acid-modified polypropylene resin produced by using the present polypropylene resin is at least 90° C., whereby heat sterilization by boiling is possible. It is more preferably at least 120° C., whereby the acid-modified polypropylene resin may be applicable to retort packaging. The melting point can be measured by using a differential scanning calorimeter (DSC) usually at a temperature-raising and temperature-lowering rate of 10° C./min. The melting point is usually at most 200° C.

Further, the acid-modified polypropylene resin preferably has high oil resistance, whereby it can be used for packaging of a very oily substance such as oily food. Preferably, when an acid-modified polypropylene resin produced by using the present polypropylene resin is subjected to an elution test stipulated by Food Sanitation Law, the elution amount in n-heptane (25° C., 60 minutes) is at most 150 ppm, more preferably at most 30 ppm.

The molecular weight of the polypropylene resin before graft reaction is not particularly limited within a range not to significantly impair the objects of the present invention, but since the molecular weight tends to decrease by $\beta$-cleavage reaction at the time of the graft reaction, the molecular weight is preferably high, and MFR as measured in accordance with JIS K7210 at 230° C. under 21.18 N is preferably at least 0.01 g/10 min. If MFR is too low, the flowability tends to be poor, and for example, kneading is difficult at the time of melt reaction. MFR is more preferably at least 0.1 g/10 min.

Further, MFR is preferably at most 30 g/10 min. If it is too high, the object of the present invention to obtain an acid-modified polypropylene resin having a high molecular weight may not be accomplished. MFR is more preferably at most 20 g/10 min. The polypropylene resins may be used alone or two or more of them may be used in combination.

The organic acid component used in the present invention is not particularly limited within a range not to significantly impair the object of the present invention, but preferred is a saturated or unsaturated carboxylic acid or carboxylic anhydride having at least one carboxyl group. More preferred is a carboxylic acid or carboxylic anhydride having at least two carboxyl groups. Specifically, the organic acid component may, for example, be carboxylic acid such as maleic acid, fumaric acid, mesaconic acid, citraconic acid, itaconic acid, aconitic acid, crotonic acid, succinic acid, oxalic acid, malonic acid, malic acid, thiomalic acid, tartaric acid, adipic acid, citric acid, pimelic acid, suberic acid, azelaic acid or sebacic acid; or a carboxylic anhydride such as maleic anhydride, itaconic anhydride, citraconic anhydride or succinic anhydride. Preferred is maleic acid or maleic anhydride, particularly preferred is maleic anhydride. The organic acid components may be used alone or two or more of them may be use in combination.

In the present invention, the above components are mixed with heating to carry out graft reaction to obtain an acid-modified polypropylene resin. The means of mixing with heating is not particularly limited, and either of a method (melting method) of mixing the components while heat melting them to the melting point or above to let them be reacted and a method (solution method) of mixing the components while heat dissolving them in an organic solvent to let them be reacted, may be employed.

In the case of the melting method, mixing with heating is carried out using an apparatus such as a is Banbury mixer, a kneader or an extruder. Usually, the temperature is the melting point of the polypropylene resin or above. However, it is usually at most 400° C. Further, the time is usually from about 1 second to about 1 hour. The melting method has such advantageous that the reaction time is usually short, it requires little amount of effort and it is conducted at a low cost, although impurities such as an unreacted organic acid component are likely to remain since purification after the reaction is difficult.

In the case of the solution method, the components are dissolved in an optional solvent and mixed with heating. Usually, the temperature is within a range of from 20° C. to 160° C. Further, the time is usually from about 1 hour to about 10 hours. After the reaction, usually washing and purification are carried out. The washing and purification may be carried out by known means. For example, unreacted products, impurities and the like are washed away by a solvent. The solution method costs a lot but has such advantages that the reaction will proceed at a relatively low temperature and accordingly the decrease in the molecular weight hardly occurs, the reaction will uniformly be carried out and accordingly a high grafted amount is easily obtained, purification after the reaction can be conducted and accordingly impurities such as an unreacted organic acid component hardly remain, and thus a high quality acid-modified polypropylene resin is easily obtained.

It is estimated that radicals from the organic peroxide represented by the above formula (2) are stable, and accordingly the reaction easily proceeds even by the solution method at a relatively low temperature.

The solvent to be used in the solution method is not particularly limited and it may, for example, be an aromatic hydrocarbon such as benzene, toluene or xylene; an aliphatic hydrocarbon such as n-hexane, n-heptane, n-octane or n-decane; or a halogenated hydrocarbon such as trichloroethylene, perchloroethylene, monochlorobenzene or o-dichlorobenzene. Among them, preferred is an aromatic hydrocarbon or a halogenated hydrocarbon, particularly preferred is toluene, xylene or monochlorobenzene. The organic solvents may be used alone or two or more of them may be used in combination.

As described above, the process for producing an acid-modified polypropylene resin of the present invention has such an advantage that an acid-modified polypropylene resin wherein the grafted amount X (wt %) of the organic acid component is from 1.0 wt % to 20.0 wt % and the melt flow rate Y (g/10 min) satisfies the above formula (1) can be obtained.

Now, the polypropylene type resin composition of the present invention (the resin composition of the present invention) will be described.

A polypropylene type resin composition containing from 0.1 part by weight to 30 parts by weight of the acid-modified polypropylene resin of the present invention can be used for various applications as a resin composition excellent in balance among the adhesive properties, printability, insulating properties/electrical conductivity, compatibility, affinity with a filler, etc. Particularly when it is used as an adhesive resin composition, it is suitably applicable to e.g. production of a composite material made of different materials such as a laminated film or a laminated sheet, since it can bond a polyolefin type resin such as a polyethylene or a polypropylene and a polar resin such as EVOH or a polyamide with sufficient force. Further, strong adhesive force will be obtained with a small amount of use as compared with conventional one, and accordingly the amount of use can be reduced, thus leading to reduction in cost.

Further, the above-described resin of the present invention is excellent in transparency and thus the resin composition of the present invention using it can be used for coating without affecting e.g. the color tone of an object to be coated. Further, since it is excellent in affinity with e.g. an inorganic filler or a pigment, it can be used as a resin composition for coating for various articles such as automobile components.

The content of the acid-modified polypropylene resin in the polypropylene type resin composition of the present invention can be properly selected depending upon the purpose of use an use conditions, but usually from 0.1 part by weight to 30 parts by weight of the acid-modified polypropylene resin is contained. Further, with respect to the grafted amount of the organic acid component in the resin composition of the present invention, the content can properly be selected depending upon the purpose of use and use conditions, but the content is usually preferably from about 0.01 wt % to about 5 wt %.

The polypropylene type resin contained in the polypropylene type resin composition may be any one of a propylene homopolymer, a copolymer of propylene with ethylene or another α-olefin and a mixture thereof. The copolymer may be either a block copolymer or a random copolymer. In the case of a copolymer or a mixture, the polypropylene resin component is contained in an amount of preferably at least 30 wt %, more preferably at least 50 wt %. More preferably a propylene/ethylene copolymer is used. The propylene/ethylene copolymer is preferably one having a melt flow rate (230° C., 21.18 N) of from 0.5 to 200 g/10 min.

However, when the polypropylene type resin composition is used for an application for which heat resistance is particularly required such as a retort packaging for food, a polypropylene homopolymer is preferably used.

The resin composition of the present invention may contain an elastomer component as the case requires. In such a case, the amount of the elastomer component is preferably from 0 to 200 parts by weight, more preferably from 1 to 150 parts by weight, furthermore preferably from 2 to 100 parts by weight per 100 parts by weight of the polypropylene type resin. The elastomer component may, for example, be an ethylene/α-olefin copolymer elastomer or a styrene-containing thermoplastic elastomer.

The content of α-olefin units in the ethylene/α-olefin random copolymer elastomer is preferably from 10 to 70 wt %, more preferably from 1 to 55 wt %. If the content of the α-olefin units is lower than the above range, the resin composition tends to be poor in impact strength, and if the content is too high, not only the rigidity tends to decrease but also the elastomer component can hardly be maintained in the form of pellets, thus remarkably decreasing handling properties in production of the resin composition.

The α-olefin in the ethylene/α-olefin random copolymer elastomer is not particularly limited but is preferably one having from 3 to 20 carbon atoms. Specifically, it may, for example, be propylene, 1-butene, 1-pentene, 1-hexene, 1-heptene, 1-octene, 1-nonene, 1-decene, 1-undecene or 1-dodecene. Among them, particularly preferred is propylene, 1-butene, 1-pentene, 1-hexene, 1-heptene or 1-octene. The MFR (230° C., 21.18 N) of the ethylene/α-olefin random copolymer elastomer is preferably from 0.01 to 100 g/10 min, more preferably from 0.1 to 100 g/10 min. One having a MFR less than 0.01 g/10 min may not sufficiently be dispersed at the time of kneading to form the resin composition, and such tends to cause a decrease in the impact strength. On the other hand, one having a MFR exceeding 100 g/10 min is insufficient in toughness of the copolymer rubber itself and tends to decrease the impact strength.

Further, the density of the ethylene/α-olefin random copolymer elastomer is preferably from 0.85 to 0.90 g/cm$^3$, particularly preferably from 0.86 to 0.89 g/cm$^3$. One having a density exceeding 0.90 g/cm$^3$ tends to impair the impact strength, and one having a density less than 0.85 g/cm$^3$ tends to be hardly pelletized. Further, preferred is one produced by using a vanadium compound type catalyst or a metallocene type catalyst as disclosed in e.g. WO91/04257 described hereinafter.

The styrene-containing thermoplastic elastomer has a polystyrene content of preferably from 5 to 60 wt %, more preferably from 10 to 30 wt %. If the polystyrene content is out of the above range, the impact strength tends to be insufficient. The MFR (230° C., 21.18 N) of the styrene-containing thermoplastic elastomer is preferably from 0.01 to 100 g/10 min, more preferably from 0.1 to 50 g/10 min. If the MFR is out of the above range, the impact strength tends to be insufficient.

Specifically, the styrene-containing thermoplastic elastomer may, for example, be a styrene-ethylene/butylene-styrene block copolymer (SEBS). This is a thermoplastic elastomer comprising polystyrene block units and polyethylene/butylene rubber block units. In such a SEBS, the polystyrene block units as a hard segment form physical crosslinking (domain) and are present as crosslinked sites of the rubber block units, and the rubber block units present between the polystyrene block units are a soft segment and have rubber elasticity. As the segment ratio of SEBS, the polystyrene units are contained preferably in an amount of from 10 to 40 mol %. The content of units derived from styrene is a value measured by a conventional method such as an infrared spectrum analysis method or a $^{13}$C-NMR method.

The resin composition of the present invention may further contain an inorganic filler component as the case requires. In such a case, the amount of the inorganic filler component is preferably from 0 to 200 parts by weight, more preferably from 1 to 150 parts by weight, furthermore preferably from 2 to 100 parts by weight.

The inorganic filler component is preferably a powdery filler such as natural silicic acid or silicate such as talc, kaolinite, calcined clay, pyrophyllite, sericite or wollastonite, a carbonate such as precipitated calcium carbonate, heavy calcium carbonate or magnesium carbonate, a hydroxide such as aluminum hydroxide or magnesium hydroxide, an oxide such as zinc oxide, zinc white or magnesium oxide, or synthetic silicic acid or silicate such as hydrated calcium silicate, hydrated aluminum silicate, hydrated silicic acid or silicic anhydride, a flaky filler such as mica, a fibrous filler such as glass fibers, basic magnesium sulfate whiskers, calcium titanate whiskers, aluminum borate whiskers, sepiolite, PMF (processed mineral fiber) xonotlite, potassium titanate or ellestadite, or a balloon-like filler such as a glass balloon or a fly-ash balloon.

Among such inorganic fillers, talc is preferably used, and a talc impalpable powder having an average particle size of from 0.1 to 40 μm is particularly preferably used. The average particle size of talc can be measured by a liquid phase sedimentation method. Further, the inorganic filler to be used in the present invention, particularly talc may not be treated or may preliminarily surface treated. The surface treatment may, for example, be chemical or physical treatment using a treating agent such as a silane coupling agent, a higher fatty acid, an aliphatic acid metal salt, an unsaturated organic acid, an organic titanate, a resin acid or polyethylene glycol. When such surface treated talc is used, a resin composition excellent in weld strength, coating properties and moldability can be obtained. Such inorganic fillers may be used alone or two or more of them may be used in combination.

For the resin composition of the present invention, in addition to the above components, a stabilizer such as an antioxidant, a weather stabilizer or a heat resisting agent; a colorant such as titanium oxide or an inorganic pigment; or an additive such as an electrical conductivity-imparting agent such as carbon black or ferrite, a preservative, a fungicide or an anticorrosive may be used as the case requires. Further, in order to improve wettability with a substrate to be coated, a small amount of an organic solvent may be added as the case requires.

Further, the resin composition of the present invention may further contain various stabilizers, ultraviolet absorbers, etc.

A preferably used stabilizer may, for example, be a phenol type stabilizer such as 2,6-di-t-butyl-4-methylphenol, tetrakis[methylene(3,5-di-4-hydroxyhydrocinnamate)]methane, metaoctadecyl-3-(4'-hydroxy-3,5-di-t-butylphenyl)propionate, 2,2'-methylenebis(4-methyl-6-t-butylphenol), 4,4'-butylidenebis(3-methyl-6-t-butylphenol), 2,2-thiobis(4-methyl-6-t-butylphenol), 1,3,5-trimethyl-2,4,6-tris(3,5-di-t-butyl-4-hydroxybenzyl)benzene or 1,3,5-tris(2-methyl-4-hydroxy-5-t-butylphenol)butane; a sulfur type stabilizer such as dilauryl thiodipropionate or distearyl thiodipropionate; or a phosphorus type stabilizer such as tridecyl phosphite or trinonylphenyl phosphite.

Further, a preferably used ultraviolet absorber may, for example, be 2-hydroxy-4-octoxybenzophenone, 2-ethylhexyl-2-cyano-3,3-diphenylacrylate or p-octylphenyl salicylate.

Now, the adhesive resin composition of the present invention will be described. The adhesive resin composition of the present invention comprises the above-described polypropylene type resin composition of the present invention, and has such an advantage that it has high adhesive properties to various materials such as a resin such as a polyolefin (polypropylene, polyethylene), an ethylene/vinyl alcohol copolymer (EVOH), a polyamide, a polyester or a polycarbonate, a metal such as aluminum, iron, nickel or copper, paper, cotton or a fabric such as chemical fibers, whereby a laminate with high adhesion between layers can be obtained.

The laminate is not particularly limited but examples thereof include laminates having structures of polypropylene/an adhesive layer comprising the adhesive resin composition of the present invention (hereinafter referred to simply as adhesive layer)/polyethylene terephthalate (PET), PET/adhesive layer/EVOH, PET/adhesive layer/polyamide, polypropylene/adhesive layer/EVOH/adhesive layer/PET, polypropylene/adhesive layer/polyamide/adhesive layer/PET and polyethylene/adhesive layer/EVOH/adhesive layer/PET. These laminates may be used as a food packaging material.

Further, a laminate of polypropylene/adhesive layer/aluminum may, for example, be mentioned, which can be used for an aluminum composite board for building, an industrial pipe, a food packaging material, a battery or the like.

Further, a laminate of polypropylene/adhesive layer/iron or polypropylene/adhesive layer/nickel may, for example, be mentioned, which can be used for an industrial pipe.

Now, the laminate of the present invention will be described below.

The laminate of the present invention comprises a substrate, and at least an adhesive layer comprising the above-described polypropylene type resin composition of the present invention and a layer made of an ethylene/vinyl alcohol copolymer (EVOH) or a polyamide formed on the substrate.

The substrate may be made of a resin such as a polyolefin or a polyester or a metal or the like, but preferably made of a polyolefin type resin excellent in moldability, mechanical strength, chemical resistance, etc., more preferably a polypropylene type resin in view of heat resistance, etc. A polypropylene type resin is a resin containing propylene in an amount of at least 50 wt %. It preferably contains propylene in an amount of at least 70 wt %.

A polypropylene type resin may be known one and is not particularly limited, and it may, for example, be a propylene homopolymer, or a copolymer of propylene with at least one another comonomer, for example, an α-olefin comonomer having at least 2 carbon atoms such as ethylene, butene-1, pentene-1, hexene-1, heptene-1, octene-1, cyclopentene, cyclohexene or norbornene.

The α-olefin comonomer is preferably a $C_{2-6}$ α-olefin comonomer. Further, a copolymer of an α-olefin monomer with a comonomer such as vinyl acetate, an acrylate or a methacrylate, a copolymer of an α-olefin monomer with a comonomer such as an aromatic vinyl monomer or its hydrogenated product, a hydrogenated product of a conjugated diene block copolymer may, for example, be also used. Further, a copolymer may be a random copolymer or a block copolymer unless otherwise specified. Further, the propylene type polymer may be modified as the case requires.

The above copolymers may be used alone or as a mixture. The substrate is usually in the form of a sheet or a film.

The thickness of the substrate may properly be selected depending upon the material or the shape of the substrate, the purpose of use, etc., but to keep the rigidity of the substrate, it is preferably at least 0.01 mm, more preferably at least 0.03 mm. Further, it is preferably at most 10 mm, more preferably at most 2 mm in view of handling efficiency, etc.

The thickness of the adhesive layer comprising the polypropylene type resin composition of the present invention is preferably at least 0.001 mm, more preferably at least 0.003 mm in order to achieve sufficient adhesive function. Further, it is preferably at most 0.3 mm, more preferably at most 0.1 mm since if it is too thick, the effects will no more improve but the cost will rather increase.

The layer made of an ethylene/vinyl alcohol copolymer (EVOH) or a polyamide functions as a gas barrier layer (a layer through which no oxygen permeates). A method for producing EVOH or the polyamide may be conventional one and is not particularly limited. The thickness of the gas barrier layer is preferably at least 0.001 mm so as to achieve sufficient gas barrier function, more preferably at least 0.003 mm. Further, it is preferably at most 0.3 mm, more preferably at most 0.1 mm, since the effects will not improve even though it is too thick, and the cost will increase in vain.

The laminate may have, in addition to the substrate, the adhesive layer and the gas barrier layer, another layer between the respective layers or on or below the layer as the case requires. As preferred examples, a is regrind material layer may be sandwiched between the substrate and the adhesive layer, or a print layer may be formed on the substrate. Further, each of the layers may be a multilayer film consisting of two or more layers.

Specifically, examples of the laminate include laminates of polypropylene/adhesive layer/gas barrier layer, polypropylene/regrind material layer/adhesive layer/gas barrier layer, polypropylene/adhesive layer/gas barrier layer/adhesive layer/polypropylene, and polypropylene/regrind material layer/adhesive layer/gas barrier layer/adhesive layer/polypropylene, but the laminate is not limited thereto.

A method for producing such a laminate may be known one and is not particularly limited. Specifically, for example, the laminate may be obtained by co-extrusion or heat lamination. The shape of the laminate to be obtained is not particularly limited and it may, for example, be the shape of a bottle, a cup, a tube or a sheet.

The laminate of the present invention obtained by bonding a polyolefin type resin substrate excellent in moldability, mechanical strength and chemical resistance and a layer made of EVOH or a polyamide excellent in gas barrier properties and aroma-retention properties by means of an adhesive layer having high adhesive properties to both resins, can be preferably applied to food packaging materials and medical packaging materials, and is capable of prolonging the preservation period of contents in such packaging materials as compared with conventional one. The food packaging material may, for example, be a packaging material for soybean paste, dessert, a beverage or a ham, and the medical packaging material may, for example, be an infusion solution bag.

EXAMPLES

Now, the present invention will be described in further detail with reference to Examples, but the present invention is by no means restricted to the following Examples within a range not to exceed the object and the scope of the present invention.

(Methods of Analysis)

In Examples, the melt flow rate Y (g/10 min) of the acid-modified polypropylene resin was measured in accordance with JIS K7210 at 180° C. under 21.18 N. However, MFR of a polypropylene homopolymer was usually measured at 230° C. under 21.18 N.

Further, the grafted amount was determined as follows. An acid-modified polypropylene resin was hot pressed to prepare a film with a thickness of about 100 μm, and its infrared absorption spectrum was measured. From the area of an absorption peak (a peak in the vicinity of 1,780 $cm^{-1}$) of a carbonyl group, the content of an organic acid component in the acid-modified polypropylene resin was calculated based on a preliminarily prepared analytical curve, and the content was regarded as the grafted amount X (wt %).

(Production of Acid-Modified Polypropylene Resin)

Example 1

100 Parts by weight of an isotactic polypropylene homopolymer having a MFR of 10 g/10 min (measured at 230° C./21.18 N), 19 parts by weight of maleic anhydride and 720 parts by weight of monochlorobenzene as an organic solvent were charged in a glass flask equipped with a stirring apparatus, a thermometer, a reflux condenser and a dropping funnel and dissolved at 112° C. in a nitrogen atmosphere. 7 Parts by weight of t-butyl peroxy isopropyl monocarbonate as an organic peroxide was added from the dropping funnel at the same temperature, followed by stirring at the same temperature for 8 hours to carry out the reaction. After completion of the reaction, the reaction system was cooled to the vicinity of room temperature and then poured into preliminarily prepared acetone at 10° C. to precipitate a polymer. The precipitated polymer was collected by filtration, and precipitation in acetone and filtration were repeatedly carried out in the same manner to wash the polymer. The washed polymer was vacuum dried to obtain a white powdery polymer.

The grafted amount X and the melt flow rate Y of the acid-modified polypropylene resin thus obtained are shown in Table 1 and FIG. 1. In Table, the value of expression (1) is a value of 18.5 exp(0.82X).

An acid-modified polypropylene having a high grafted amount and a high molecular weight is obtained, since X is 7.6 wt % and Y satisfies the expression (1).

Comparative Example 1

100 Parts by weight of an isotactic polypropylene homopolymer having a MFR of 10 g/10 min (measured at 230° C./21.18 N), 19 parts by weight of maleic anhydride and 720 parts by weight of monochlorobenzene as an organic solvent were charged in a glass flask equipped with a stirring apparatus, a thermometer, a reflux condenser and a dropping funnel and dissolved at 130° C. in a nitrogen atmosphere. 10 Parts by weight of dicumyl peroxide as an organic peroxide was added from the dropping funnel at the same temperature, followed by stirring at the same temperature for 4 hours to carry out the reaction. After completion of the reaction, the reaction system was cooled to the vicinity of room temperature and then poured into preliminarily prepared acetone at 10° C. to precipitate a polymer. The precipitated polymer was collected by filtration, and precipitation in acetone and filtration were repeatedly carried out in the same manner to wash the polymer. The washed polymer was vacuum dried to obtain a white powdery polymer. The grafted amount X and the melt flow rate Y of the acid-modified polypropylene resin thus obtained are shown in Table 1 and FIG. 1.

Example 2

100 Parts by weight of an isotactic polypropylene homopolymer having a MFR of 10 g/10 min (measured at 230° C./21.18 N), 19 parts by weight of maleic anhydride and 1,125 parts by weight of monochlorobenzene as an organic solvent were charged in a glass flask equipped with a stirring apparatus, a thermometer, a reflux condenser and a dropping funnel and dissolved at 112° C. in a nitrogen atmosphere. 3 Parts by weight of t-hexyl peroxy isopropyl monocarbonate as an organic peroxide was added from the dropping funnel at the same temperature, followed by stirring at the same temperature for 6 hours to carry out the reaction. After completion of the reaction, the reaction system was cooled to the vicinity of room temperature and then poured into preliminarily prepared acetone at 10° C. to precipitate a polymer. The precipitated polymer was collected by filtration, and precipitation in acetone and filtration were repeatedly carried out in the same manner to wash the polymer. The washed polymer was vacuum dried to obtain a white powdery polymer. The grafted amount X and the melt flow rate Y of the acid-modified polypropylene resin thus obtained are shown in Table 1 and FIG. 1.

Comparative Example 2

A polymer was obtained in the same manner as in Example 2 except that t-butyl monoperoxy maleate was used as the organic peroxide. The grafted amount X and the melt flow rate Y of the acid-modified polypropylene resin thus obtained are shown in Table 1 and FIG. 1.

Example 3

100 Parts by weight of an isotactic polypropylene homopolymer having a MFR of 10 g/10 min (measured at 230° C./21.18 N), 50 parts by weight of maleic anhydride and 1,230 parts by weight of toluene as an organic solvent were charged in a glass flask equipped with a stirring apparatus, a thermometer, a reflux condenser and a dropping funnel and dissolved at 112° C. in a nitrogen atmosphere. 4.8 Parts by weight of t-butyl peroxy isopropyl monocarbonate as an organic peroxide was added from the dropping funnel at the same temperature, followed by stirring at the same temperature for 5.5 hours to carry out the reaction. After completion of the reaction, the reaction system was cooled to the vicinity of room temperature and then poured into preliminarily prepared acetone at 10° C. to precipitate a polymer. The precipitated polymer was collected by filtration, and precipitation in acetone and filtration were repeatedly carried out in the same manner to wash the polymer. The washed polymer was vacuum dried to obtain a white powdery polymer. The grafted amount X and the melt flow rate Y of the acid-modified polypropylene resin thus obtained are shown in Table 1 and FIG. 1.

Comparative Example 3

A polymer was obtained in the same manner as in is Example 3 except that 1,1-bis(t-butylperoxy)-3,3,5-trimethylcyclohexane was used as the organic peroxide in a blend ratio of 4.1 parts by weight. The grafted amount X and the melt flow rate Y of the acid-modified polypropylene resin thus obtained are shown in Table 1 and FIG. 1.

Comparative Example 4

A polymer was obtained in the same manner as in Example 3 except that bis(4-t-butylcyclohexyl) peroxydicarbonate was used as the organic peroxide in a blend ratio of 11 parts by weight. The grafted amount X and the melt flow rate Y of the acid-modified polypropylene resin thus obtained are shown in Table 1 and FIG. 1.

Comparative Example 5

A polymer was obtained in the same manner as in Example 3 except that m-toluoyl and benzoyl peroxide (NYPER BMT-T40, manufactured by NOF CORPORATION) was used as the organic peroxide in a blend ratio of 11 parts by weight. The grafted amount X and the melt flow rate Y of the acid-modified polypropylene resin thus obtained are shown in Table 1 and FIG. 1.

Example 4

100 Parts by weight of an isotactic polypropylene homopolymer having a MFR of 1 g/10 min (measured at 230° C./21.18 N), 19 parts by weight of maleic anhydride and 1,242 parts by weight of monochlorobenzene as an organic solvent were charged in a glass flask equipped with a stirring apparatus, a thermometer, a reflux condenser and a dropping funnel and dissolved at 130° C. in a nitrogen atmosphere. 3 Parts by weight of t-butyl peroxy isopropyl monocarbonate as an organic peroxide was added from the dropping funnel at the same temperature, followed by stirring at the same temperature for 2 hours to carry out the reaction. After completion of the reaction, the reaction system was cooled to the vicinity of room temperature and then poured into preliminarily prepared acetone at 10° C. to precipitate a polymer. The precipitated polymer was collected by filtration, and precipitation in acetone and filtration were repeatedly carried out in the same manner to wash the polymer. The washed polymer was vacuum dried to obtain a white powdery polymer. The grafted amount X and the melt flow rate Y of the acid-modified polypropylene resin thus obtained are shown in Table 1 and FIG. 1.

An acid-modified polypropylene having a remarkably high grafted amount as compared with conventional one and having a high molecular weight was obtained, since the raw material polypropylene resin has a considerably high molecular weight with a MFR of 1 g/10 min, although the grafted amount was slightly small probably because the reaction time was so short as 2 hours.

Comparative Example 6

A polymer was obtained in the same manner as in Example 4 except that dicumyl peroxide was used as the organic peroxide in a blend ratio of 3.5 parts by weight. The grafted amount X and the melt flow rate Y of the acid-modified polypropylene resin thus obtained are shown in Table 1 and FIG. 1.

(Preparation of Adhesive Resin Composition and Laminated Sheet)

An adhesive resin composition was prepared and a polypropylene/EVOH multilayer sheet molded product was produced as follows. Properties of the respective resins used below were as follows.

Propylene/ethylene random copolymer (EG7F, manufactured by Japan Polypropylene Corporation, MFR 230° C./21.18 N load: 1.3 g/10 min)

Propylene/ethylene copolymer elastomer (EP07Y, manufactured by JSR Corporation, propylene content: 27%, MFR 230° C./21.18 N load: 0.7 g/10 min)

Ethylene/vinyl alcohol copolymer (KURARAY EVAL EP J102B, manufactured by KURARAY CO., LTD., ethylene content: 32 mol %, MFR 230° C./21.18 N load: 3.9 g/10 min)

Homopolypropylene resin (EA9, manufactured by Japan Polypropylene Corporation, MFR 230° C./21.18 N load: 0.5 g/10 min)

Resins were blended to prepare a mixture in such a blend ratio that the acid-modified polypropylene resin obtained in each of Examples 1 to 4 and Comparative Examples 1 to 6 was 3 wt %, the propylene/ethylene random copolymer was 82 wt % and the propylene/ethylene copolymer elastomer was 15 wt %. Then, to 100 parts by weight of the mixture, 0.2 part by weight of a phenol type antioxidant (IRGANOX 1010 manufactured by Ciba Specialty Chemicals), 0.1 part by weight of a phosphorus type antioxidant (IRGAFOS 168 manufactured by Ciba Specialty Chemicals) and 0.03 part by weight of a neutralizer (ALCAMIZER DHT-4A manufactured by Kyowa Chemical Industry Co., Ltd.) were added, followed by mixing for one minute by using a super mixer.

Then, the mixture was melt-kneaded at a temperature of 230° C. at a number of screw revolutions of 100 rpm at an extrusion rate of 8 kg/h and extruded into strand by using a single screw extruder, cooled and then cut into pellets to obtain an adhesive resin composition.

A laminated sheet was prepared from the adhesive resin composition thus obtained, an ethylene/vinyl alcohol copolymer (hereinafter referred to as EVOH) as a gas barrier resin and a homopolypropylene resin as follows.

Molding of a three-types 5-layered sheet having a layer structure of homopolypropylene/adhesive resin composition/EVOH/adhesive resin composition/homopolypropylene was carried out at a die preset temperature of 230° C. at a line speed of 0.8 m/min to obtain a laminated sheet.

The average thickness of the laminated sheet was 1.0 mm. The thicknesses of the respective layers were such that homopolypropylene/adhesive resin composition/EVOH/adhesive resin composition/homopolypropylene were 41%, 5%, 8%, 5% and 41% of the thickness of the laminated sheet.

(Evaluation of Adhesive Resin Composition)

A rectangular sample with a width of 10 mm was cut from the laminated sheet. The average thickness of the sample was 1.0 mm. Using this sample, evaluation of adhesive properties was conducted by means of a T-peel test method using a tensile tester. The test was carried out at a test rate of 50 mm/min at temperatures of 23° C. and 100° C. The results are shown in Table 1.

TABLE 1

| | Polypropylene resin | | Organic acid | | Organic peroxide | |
|---|---|---|---|---|---|---|
| | MFR (g/10 min) | Parts by weight | Type | Parts by weight | Type | Parts by weight |
| Ex. 1 | 10 | 100 | Maleic anhydride | 19 | t-butyl peroxy isopropyl monocarbonate | 7 |
| Comp. Ex. 1 | 10 | 100 | Maleic anhydride | 19 | Dicumyl peroxide | 10 |
| Ex. 2 | 10 | 100 | Maleic anhydride | 19 | t-hexyl peroxy isopropyl monocarbonate | 3 |
| Comp. Ex. 2 | 10 | 100 | Maleic anhydride | 19 | t-butyl monoperoxy maleate | 3 |
| Ex. 3 | 10 | 100 | Maleic anhydride | 50 | t-butyl peroxy isopropyl monocarbonate | 4.8 |
| Comp. Ex. 3 | 10 | 100 | Maleic anhydride | 50 | 1,1-Bis(t-butylperoxy)-3,3,5-trimethylcyclohexane | 4.1 |
| Comp. Ex. 4 | 10 | 100 | Maleic anhydride | 50 | Bis(4-t-butylcyclohexyl) peroxydicarbonate | 11 |
| Comp. Ex. 5 | 10 | 100 | Maleic anhydride | 50 | m-toluoyl and benzoyl peroxide | 11 |
| Ex. 4 | 1 | 100 | Maleic anhydride | 19 | t-butyl peroxy isopropyl monocarbonate | 3 |

TABLE 1-continued

| | | | | | | | | |
|---|---|---|---|---|---|---|---|---|
| Comp. Ex. 6 | 1 | 100 | Maleic anhydride | 19 | Dicumyl peroxide | | | 3.5 |

| | Modified polyolefin resin | | | | | | |
|---|---|---|---|---|---|---|---|
| | Reaction conditions | | | | Value of | Adhesive strength | |
| | Solvent (parts by weight) | Temp. (°C.) | Time (hour) | X (wt %) | expression (1) | Y (g/10 min) | (N/10 mm) |
| | | | | | | | 23° C. | 100° C. |
| Ex. 1 | Monochlorobenzene (720) | 112 | 8 | 7.6 | 9568 | 670 | 65 | 25 |
| Comp. Ex. 1 | Monochlorobenzene (720) | 130 | 4 | 3.3 | 277 | 950 | 45 | 10 |
| Ex. 2 | Monochlorobenzene (1125) | 112 | 6 | 3.8 | 417 | 350 | 60 | 24 |
| Comp. Ex. 2 | Monochlorobenzene (1125) | 112 | 6 | 0.8 | 36 | 70 | 24 | 5 |
| Ex. 3 | Toluene (1230) | 112 | 5.5 | 2.6 | 156 | 88 | 53 | 23 |
| Comp. Ex. 3 | Toluene (1230) | 112 | 5.5 | 0.4 | 26 | 47 | 20 | 9 |
| Comp. Ex. 4 | Toluene (1230) | 112 | 5.5 | 0.8 | 36 | 90 | 23 | 8 |
| Comp. Ex. 5 | Toluene (1230) | 112 | 5.5 | 0.7 | 33 | 105 | 22 | 4 |
| Ex. 4 | Monochlorobenzene (1242) | 130 | 2 | 1.7 | 76 | 66 | 50 | 20 |
| Comp. Ex. 6 | Monochlorobenzene (1242) | 130 | 2 | 0.6 | 30 | 60 | 24 | 9 |

As evident from Table 1, it is understood that according to the present invention, an acid-modified polypropylene having a high molecular weight, having an organic acid component added in an extremely high grafted amount can be obtained without decreasing the molecular weight of the polypropylene resin.

Further, it is found that by incorporating an acid-modified polypropylene resin having X and Y within predetermined ranges, the adhesive strength of the adhesive resin composition at both normal temperature and high temperature remarkably improves. Heretofore, an adhesive resin composition containing a polypropylene resin tends to have poor adhesive properties to a polar resin, but it is found that according to the present invention, an adhesive resin composition having sufficient adhesive force to a polar resin such as EVOH can be provided.

Examples 5 to 7 and Comparative Examples 7 and 8

A polymer was obtained in the same manner as in Example 1 except that the conditions were changed as identified in Table 2. The grafted amount X and the melt flow rate Y of the acid-modified polypropylene resin thus obtained are shown in Table 2 and FIG. 1.

(Evaluation of Regrind Properties)

3 wt % of each of the adhesive resin compositions obtained in Examples 5 to 7 and Comparative Examples 7 and 8, 3 wt % of EVOH and 94 wt % of a propylene/ethylene random copolymer were mixed, and the mixture was extruded as a molten resin from a single screw extruder of 40 mm in diameter (L/D=28, CR=3.5, 2 stage full flight screw) at 230° C. with a discharge rate of 7 kg/h, and the molten resin was cooled in a water bath and pelletized. The obtained pellets were further extruded by the same single screw extruder under the same conditions (230° C., 7 kg/h), cooled and pelletized repeatedly twice. The obtained pellets were compression molded at 230° C. at 70 kg/cm² for 3 minutes and then cooled at 30° C. at 100 kg/cm² for two minutes to obtain a sheet with a thickness of 2 mm.

The tensile impact strength of the obtained sheet was measured as follows. In accordance with JIS K7160-1996, measurement was conducted using a JIS No. 4 test specimen with a hammer lifting angle of 150° at an impact velocity of 3.4 m/sec. The results are shown in Table 2.

TABLE 2

| | Polypropylene resin | | Organic acid | | Organic peroxide | |
|---|---|---|---|---|---|---|
| | MFR (g/10 min) | Parts by weight | Type | Parts by weight | Type | Parts by weight |
| Ex. 5 | 10 | 100 | Maleic anhydride | 19 | t-butyl peroxy isopropyl monocarbonate | 7 |
| Ex. 6 | 10 | 100 | Maleic anhydride | 9.4 | t-butyl peroxy isopropyl monocarbonate | 3.4 |
| Ex. 7 | 10 | 100 | Maleic anhydride | 19 | t-butyl peroxy isopropyl monocarbonate | 7 |
| Comp. Ex. 7 | 10 | 100 | Maleic anhydride | 19 | Dicumyl peroxide | 8 |

TABLE 2-continued

| | | | | | | | |
|---|---|---|---|---|---|---|---|
| Comp. Ex. 8 | 10 | 100 | Maleic anhydride | 19 | Dicumyl peroxide | | 4.6 |

| | Reaction conditions | | | Modified polyolefin resin | | | Tensile impact |
|---|---|---|---|---|---|---|---|
| | Solvent (parts by weight) | Temp. (° C.) | Time (hour) | X (wt %) | Value of expression (1) | Y (g/10 min) | strength (kg · cm/cm$^2$) |
| Ex. 5 | Monochlorobenzene (300) | 112 | 8 | 9.6 | 47733 | 397 | 63 |
| Ex. 6 | Monochlorobenzene (400) | 112 | 8 | 5.3 | 1428 | 530 | 60 |
| Ex. 7 | Monochlorobenzene (234) | 112 | 4 | 9.6 | 48522 | 237 | 81 |
| Comp. Ex. 7 | Monochlorobenzene (700) | 130 | 8 | 2.4 | 132 | 350 | 53 |
| Comp. Ex. 8 | Monochlorobenzene (690) | 124 | 7 | 1.4 | 58 | 110 | 52 |

As evident from Table 2, it is found that according to the present invention, by incorporating an acid-modified polypropylene resin having X and Y within predetermined ranges, the impact strength of the regrind resin improves, and a regrind material layer resistant to impact is obtained.

INDUSTRIAL APPLICABILITY

The acid-modified polypropylene resin and the polypropylene type resin composition of the present invention are excellent in balance among the adhesive properties, compatibility, printability, insulating properties/electrical conductivity, affinity with a filler, etc. and are thereby useful for various applications. Particularly, since they can be used for an adhesive capable of bonding a polyolefin type resin and a polar resin with sufficient force, they can provide a laminate as a composite material made of different materials, such as a laminated film or a laminated sheet.

Such a laminate can be used, for example as a gas barrier sheet, for bottles, cups, tubes, etc. for food and medical use.

Further, the resin and the composition of the present invention are excellent also in transparency and are excellent in affinity with e.g. an inorganic filler or a pigment and are thereby useful as a constituting component of a resin composition for coating for various articles such as automobile components.

The entire disclosure of Japanese Patent Application No. 2005-133344 filed on Apr. 28, 2005 including specification, claims, drawings and summary is incorporated herein by reference in its entirety.

The invention claimed is:

1. An acid-modified polypropylene resin, which is obtained by grafting an organic acid component to a polypropylene resin, wherein the polypropylene resin is an isotactic polypropylene resin, the grafted amount X (wt %) of the organic acid component in the acid-modified polypropylene resin is within a range of from 1.0 to 20.0 (wt %), and the melt flow rate Y (g/10 min) of the acid-modified polypropylene resin satisfies the expression:

$$Y < 18.5 exp(0.82X) \quad (1),$$

wherein the acid-modified polypropylene resin is obtained by a process which comprises mixing a polypropylene resin, an organic acid component and an organic peroxide, represented by the formula (2), with heating, to obtain the acid-modified polypropylene resin:

$$R_1\text{-}A\text{-}R_2 \quad (2)$$

wherein A is a bivalent connecting group containing at least one structure represented by —O—CO—O—O—, and each of $R_1$ and $R_2$ which are independent of each other, is a $C_{1-9}$ saturated or unsaturated hydrocarbon group.

2. A process for producing the acid-modified polypropylene resin as defined in claim 1, which comprises mixing a polypropylene resin, an organic acid component and an organic peroxide, represented by the formula (2), with heating, to obtain the acid-modified polypropylene resin:

$$R_1\text{-}A\text{-}R_2 \quad (2)$$

wherein A is a bivalent connecting group containing at least one structure represented by —O—CO—O—O—, and each of $R_1$ and $R_2$ which are independent of each other, is a $C_{1-9}$ saturated or unsaturated hydrocarbon group.

3. The process for producing the acid-modified polypropylene resin according to claim 2, wherein the mixing with heating is carried out in an organic solvent.

4. A resin composition, comprising 100 parts by weight of a resin comprising units derived from propylene, and from 0.1 to 30 parts by weight of the acid-modified polypropylene resin as defined in claim 1.

5. An adhesive resin composition comprising the resin composition as defined in claim 4.

6. A laminate comprising a substrate, and at least an adhesive layer comprising the resin composition as defined in claim 4 and a layer made of an ethylene/vinyl alcohol copolymer or a polyamide formed on the substrate.

7. The laminate according to claim 6, wherein the substrate is made of a resin comprising units derived from an olefin.

8. A resin composition, comprising 100 parts by weight of a resin, and from 0.1 to 30 parts by weight of an acid-modified polypropylene resin as obtained by the production process as defined in claim 2.

9. A resin composition, comprising 100 parts by weight of a resin, and from 0.1 to 30 parts by weight of an acid-modified polypropylene resin as obtained by the production process as defined in claim 3.

10. An adhesive resin composition comprising the resin composition as defined in claim 8.

11. An adhesive resin composition comprising the resin composition as defined in claim 9.

12. A laminate comprising a substrate, and at least an adhesive layer comprising the resin composition as defined in claim 8 and a layer made of an ethylene/vinyl alcohol copolymer or a polyamide formed on the substrate.

13. A laminate comprising a substrate, and at least an adhesive layer comprising the resin composition as defined in claim 9 and a layer made of an ethylene/vinyl alcohol copolymer or a polyamide formed on the substrate.

14. The laminate according to claim 12, wherein the substrate is made of a resin comprising units derived from an olefin.

15. The laminate according to claim 13, wherein the substrate is made of a resin comprising units derived from an olefin.

16. The acid-modified polypropylene resin according claim 1, wherein Y<18.5 exp(0.78x).

17. The acid-modified polypropylene resin according claim 1, wherein Y is at most 100,000 g/10 min and at least 1 g/10 min.

18. The process for producing the acid-modified polypropylene resin according to claim 2, wherein the organic peroxide is t-butyl peroxy isopropyl monocarbonate.

19. The process for producing the acid-modified polypropylene resin according to claim 2, wherein the organic peroxide is t-hexyl peroxy isopropyl monocarbonate.

20. The acid-modified polypropylene resin according to claim 1, wherein the polypropylene resin is a propylene homopolymer.

* * * * *